Figure 1:
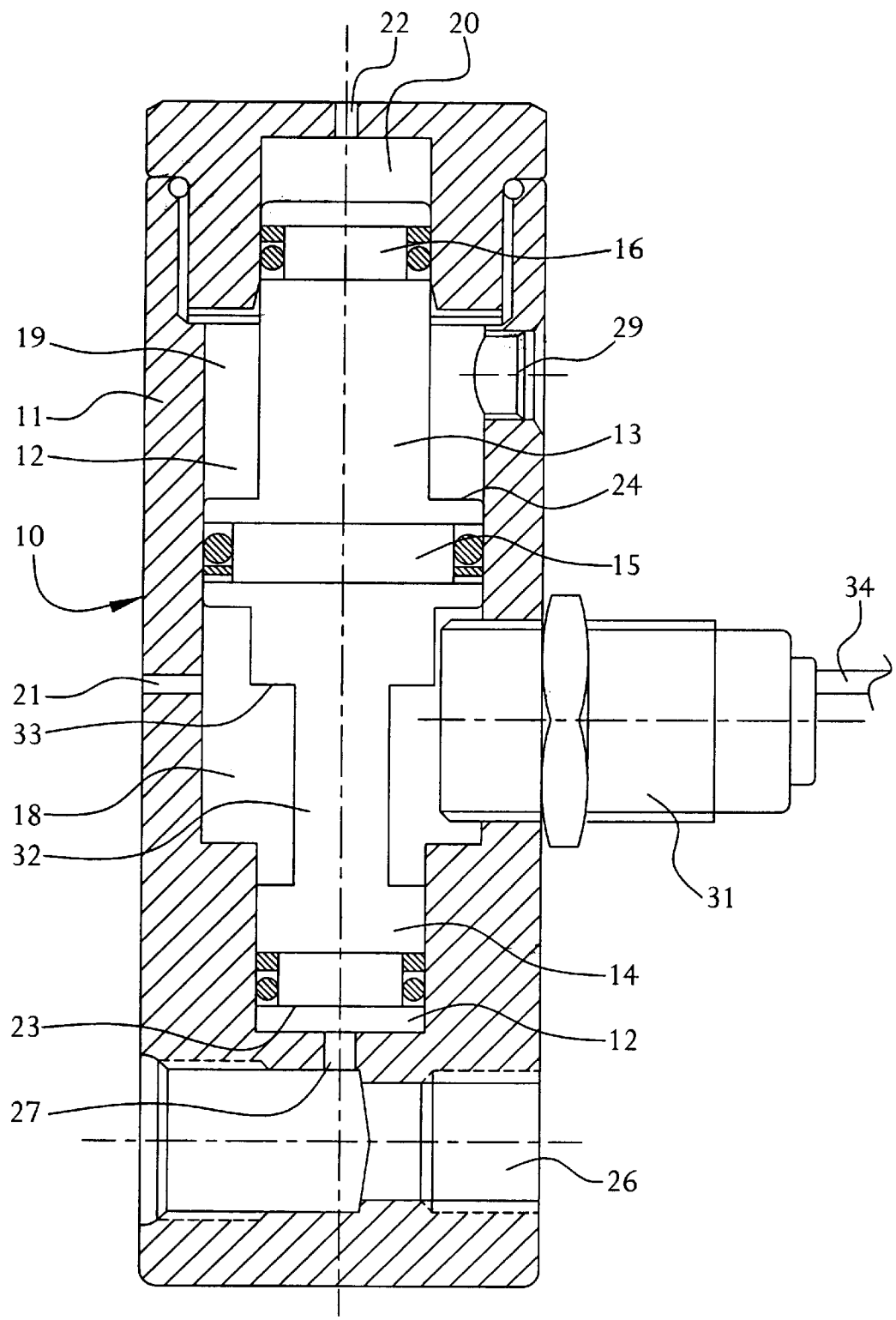

United States Patent [19]
Granfelt

[11] Patent Number: 6,044,863
[45] Date of Patent: Apr. 4, 2000

[54] SAFETY DEVICE AGAINST RUPTURES IN GAS PIPES

[76] Inventor: Claes Granfelt, Box 2103, S-135 02 Tyresö, Sweden

[21] Appl. No.: 09/004,156

[22] Filed: Jan. 7, 1998

[51] Int. Cl.[7] .................................................. E03B 7/07
[52] U.S. Cl. ......................... 137/557; 137/460; 137/554
[58] Field of Search .................................... 137/554, 557, 137/460

[56] References Cited

U.S. PATENT DOCUMENTS

| 2,926,690 | 3/1960 | Martin | 137/460 |
|---|---|---|---|
| 4,223,692 | 9/1980 | Perry | 137/460 |
| 4,732,190 | 3/1988 | Polselli | 137/460 |
| 5,228,469 | 7/1993 | Otten et al. | 137/554 |
| 5,257,014 | 10/1993 | Zimmermann | 137/554 |

FOREIGN PATENT DOCUMENTS 1294382   1/1970   United Kingdom .

*Primary Examiner*—A. Michael Chambers

[57] ABSTRACT

A safety device against ruptures in gas pipes comprises a housing (11) with a cavity (12) and a plunger (13) movable to and fro in the cavity (12). The plunger (13) has parts (14, 15) in engagement with the wall of the cavity and two influencing surfaces (23, 24) of different sizes. The smaller influencing surface (23) communicates with a main pipe (25) from a gas source to a user. The larger influencing surface (24) communicates with a control pipe (28) from the main pipe (25) spaced from the device. The plunger (13) influences the gas flow in the main pipe (25) with its movement and/or indicates a pressure drop in the control pipe (28).

20 Claims, 6 Drawing Sheets

SAFETY DEVICE AGAINST RUPTURES IN GAS PIPES

The present invention relates to a safety device against ruptures in gas pipes In most gas systems, particularly where high pressures or large stocks of gas are involved, a safety system is necessary against pipe ruptures or excessive gas flows. This is especially advantageous in the case of long pipe lines alid/or pipe lines that are accident-prone.

Various types of flow indicators or pipe-rapture valves are known but are designed primarily for hydraulic systems, not gas pipe lines. Certain problems arise with known equipment when used in gas systems since the gas has varying density at different pressures and the indicating devices or shut-downs of the system becomes random, or in other words a pure lottery.

The object of the invention is to solve the above-mentioned problems of rupture in gas pipes and to provide a safety device that is not dependent on the gas flow or the density of the gas.

This object is achieved with a safety device as claimed in claim 1.

Particularly advantageous embodiments are obtained if the device has the features defined in the subclaims.

Figure 2:
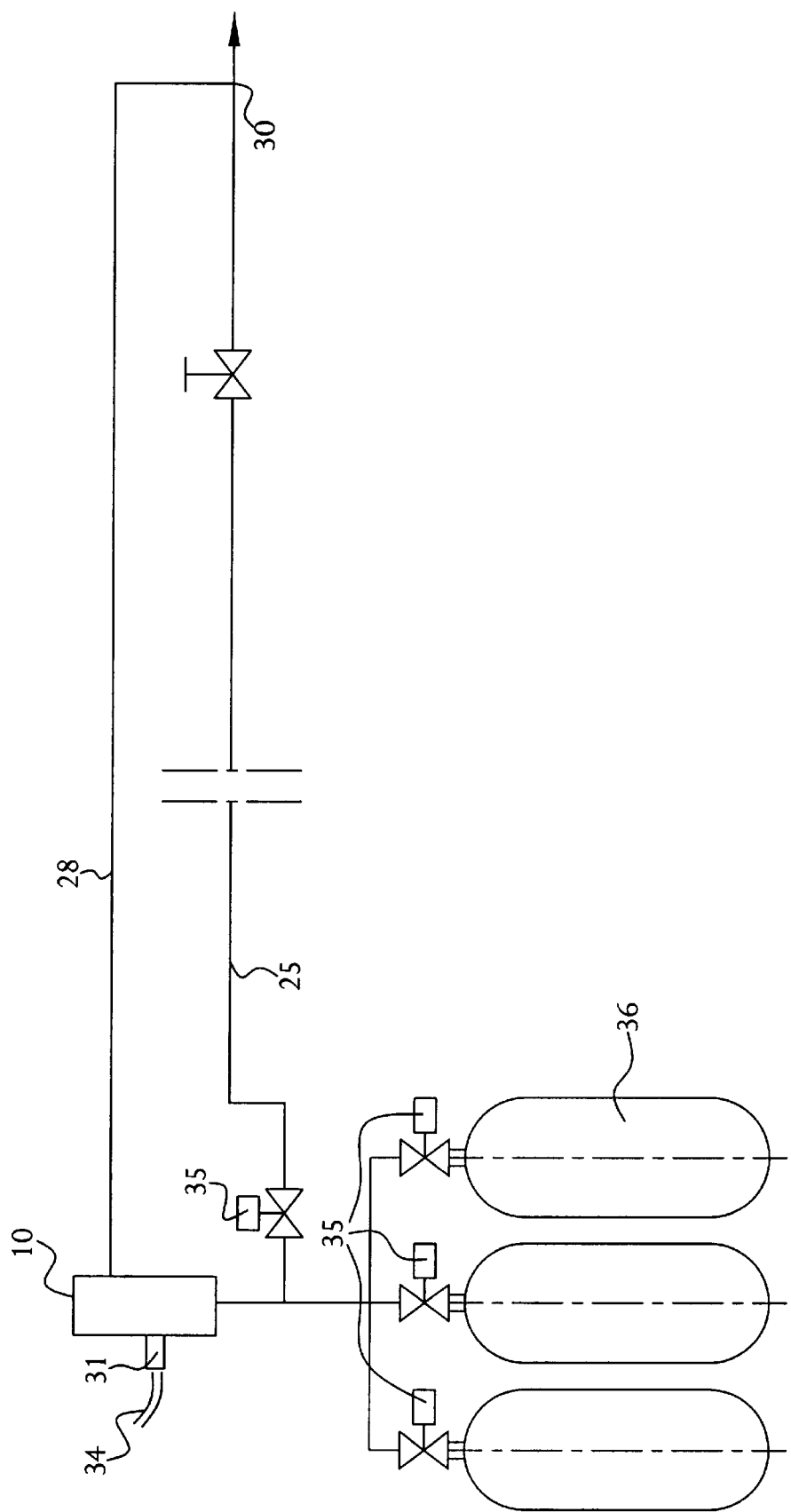
Figure 3:
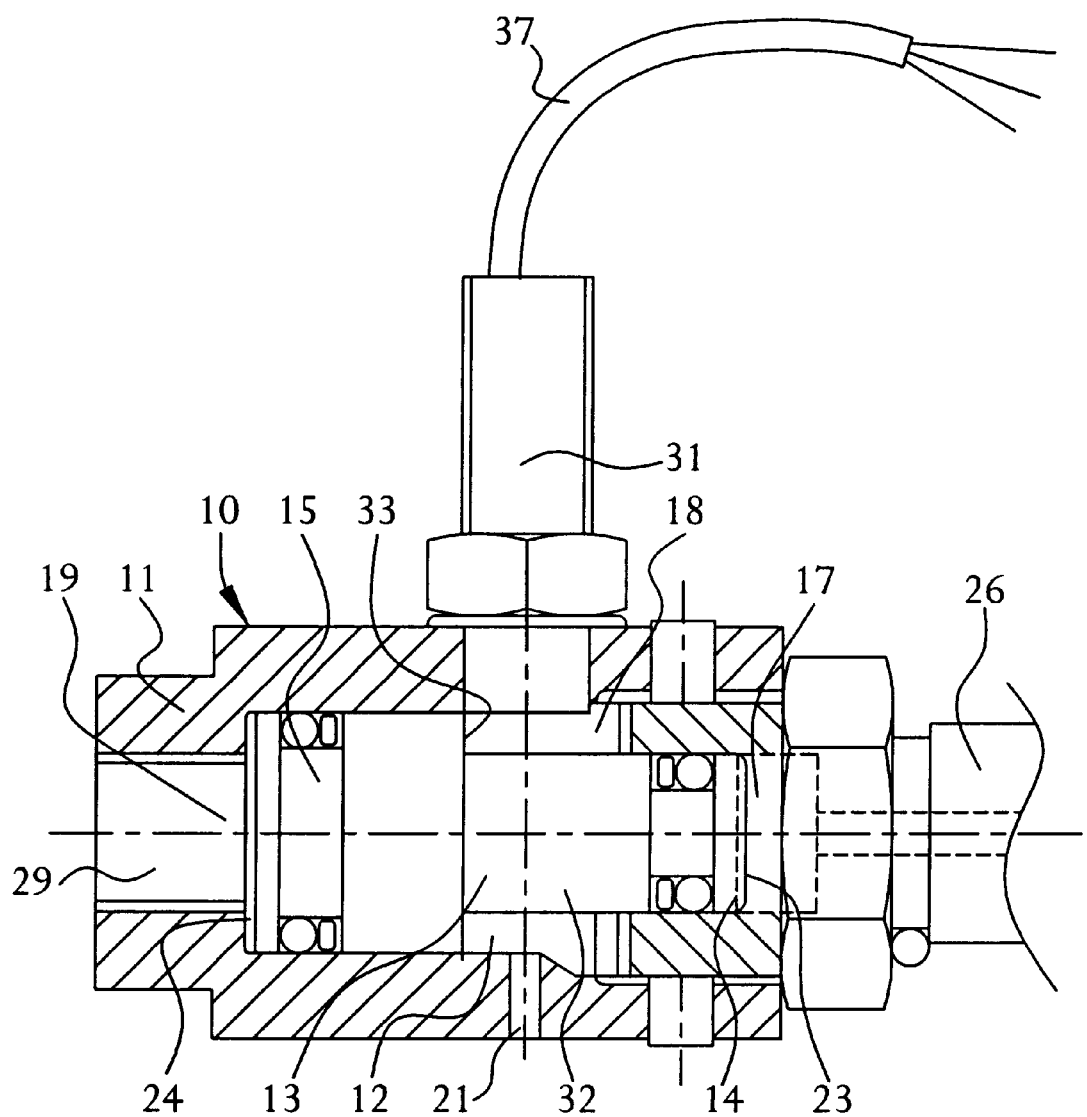
Figure 4:
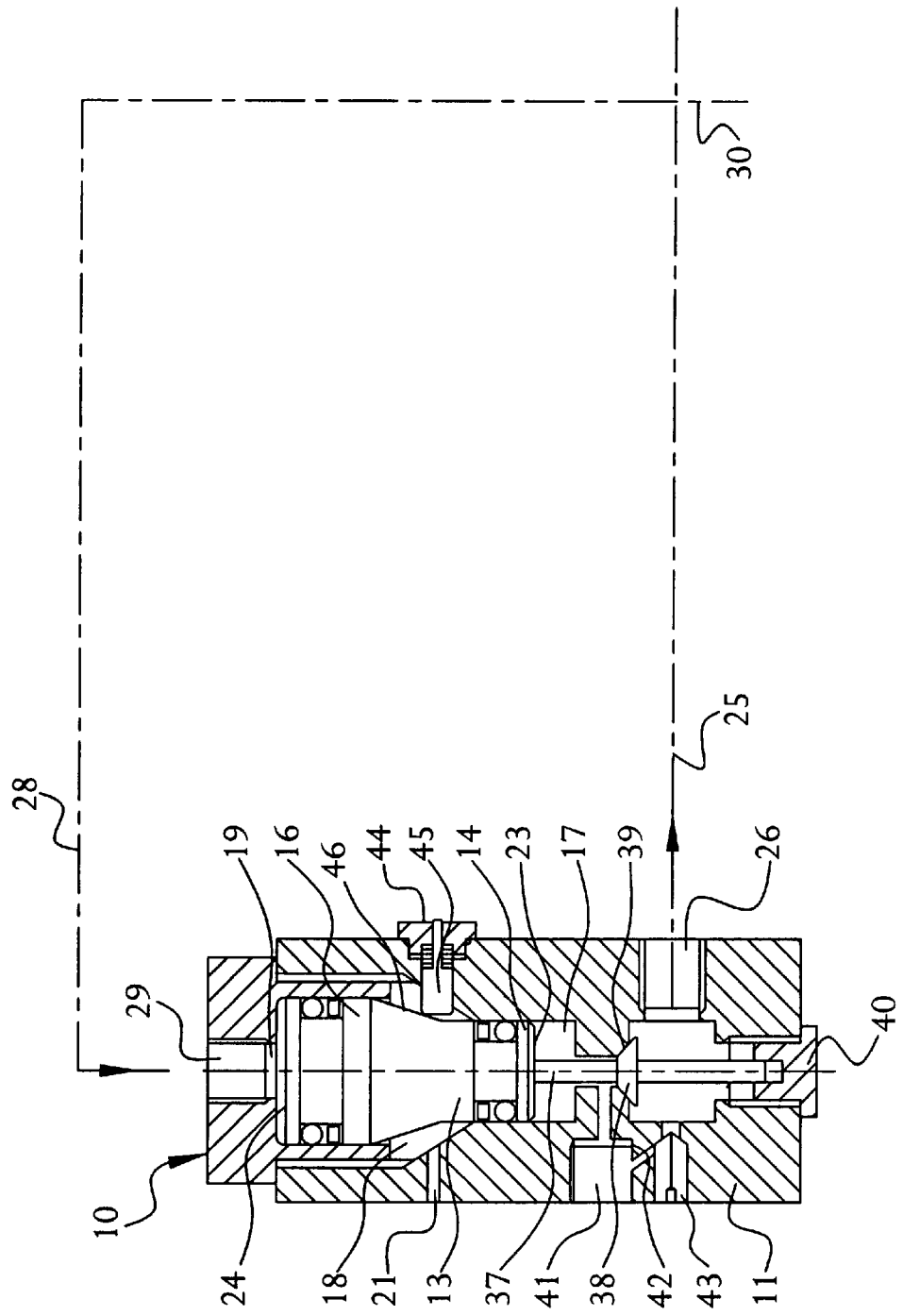
Figure 5:
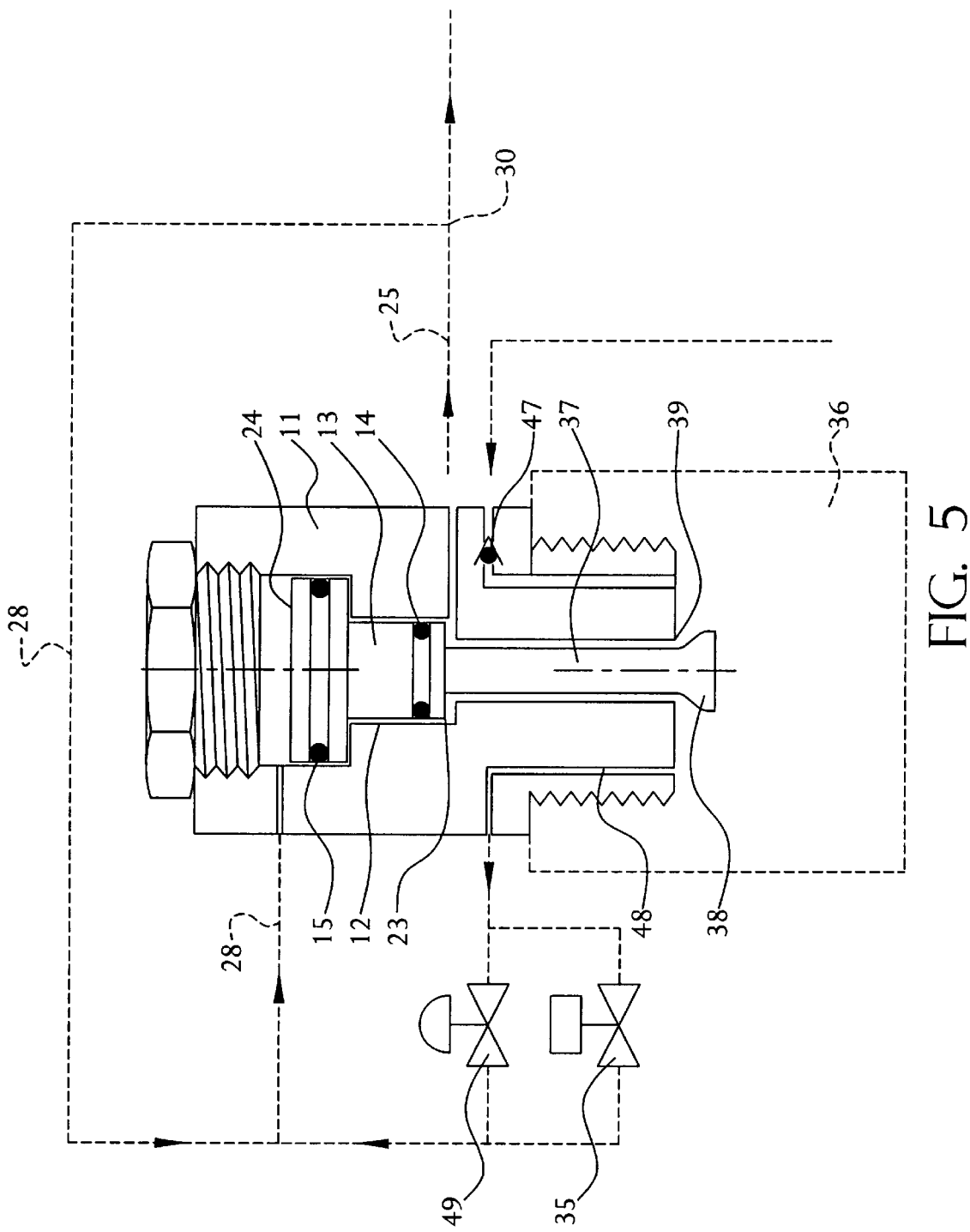
Figure 6:
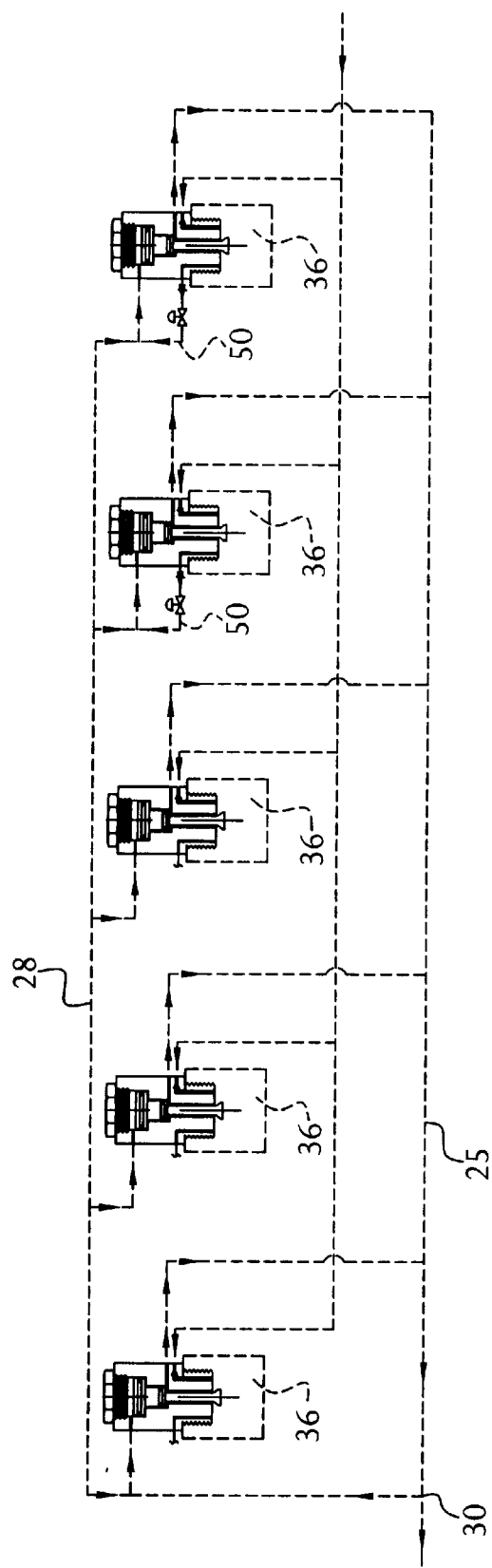

The invention will now be described in more detail with reference to the accompanying drawings in which, FIG. 1 shows a longitudinal section through a safety device according to the invention, FIG. 2 shows schematically the device according to the invention connected in a gas pipe system, FIG. 3 shows a second embodiment of the safety device according to the invention, FIG. 4 shows another embodiment of the safety device according to the invention, FIG. 5 shows yet another embodiment of the safety device according to the invention, and FIG. 6 shows the safety device in FIG. 5 connected in a multiple tank system.

FIG. 1 illustrates an embodiment of the safety device according to the invention in its entirety, designated 10. It comprises a housing 11 with a cavity 12. A plunger 13 is movable to and fro in the cavity 12. The plunger is composed of parts 14, 15 and 16 in sealing engagement with the wall of the cavity 12. The parts 14, 15 and 16 in sealing engagement with the wall of e cavity 12 divide the cavity 12 into four chambers 17, 18, 19 and 20. Of these the chambers 18 and 20 are pressure-relieved via channels 21 and 22, respectively.

The parts 14 and 15 of the plunger 13 have influencing surfaces 23 and 24, respectively, of different sizes, the influencing surface 23 being smaller than the influencing surface 24. These two influencing surfaces 23 and 24 face the chambers 17 and 19, respectively, which are under gas pressure.

The main pipe 25 (FIG. 2) in a gas pipeline system is connected to the safety device 10 via connection 26. The connection 26 communicates with the chamber 17 via the channel 27 and the main pipe 25 thus communicates with the influencing surface 23 on the plunger 13. A control pipe 28 (FIG. 2) is connected to a connection 29 which communicates with the chamber 19 so that the control pipe 28 communicates with the influencing surface 24 on the plunger 13 The control pipe 28 is connected to the main pipe 25 via point 30 in the proximity of the user.

A transducer 31 is arranged in the chamber 18, in this case an inductive transducer. The two parts 14 and 15 of the plunger 13 are joined by means of a rod 32, the diameter of which changes at a shoulder 33. When the plunger moves backwards and forwards in the cavity 12 a voltage is induced in the transducer, due to the movement of the shoulder 33, which can then be utilized in the manner stated.

FIG. 3 shows a modified embodiment of the safety device according to the invention This differs from the embodiment according to claim 1 in that the plunger has only two parts 14 and 15 in sealing engagement with the wall of the cavity 12. The cavity 12 is therefore only divided into three chambers 17, 18 and 19. As in the embodiment according to FIG. 1, the main pipe 25 communicates with the chamber 17 via the connection 26. This, however, is designed somewhat differently from that in FIG. 1. As in FIG. 1 the control pipe 28 communicates with the chamber 19 and thus with the influencing surfaces 24 on the plunger 13. All parts in the embodiment according to FIG. 3 have been given the same designations as corresponding parts in the embodiment according to FIG. 1.

The embodiments of the safety device according to the invention shown in FIGS. 1 and 3 that act only to indicate ruptures in pipes or hoses, function in the following manner: During operation of the gas system the same operational pressure prevails in the main pipe 25 as in the control pipe 28, i.e. the same pressure in the chamber 17 as in the chamber 19. This means that the plunger 13 is pushed downwards as in FIG. 1 (to the right in FIG. 3) since the influencing surface 24 is larger than the influencing surface 23. In the event of a pipe rupture, the pressure drops sharply at the point 30 and in the control pipe 28, so that the plunger 13 is pushed upwards in FIG. 1 (to the left in FIG. 3), which is immediately indicated by the transducer 31 since this reacts to displacement of the shoulder 33. The transducer 31, connected to solenoid valves 35 or the like via tubing 34, is then able to shut off the supply of gas from the gas source 36.

FIG. 4 shows a third embodiment of the safety device according to the invention, in which the shut-off function for the gas has also been integrated. It differs from the embodiments described earlier in that it is not provided with a transducer, in turn connected to shut-off valves.

Instead, the plunger 13 is rigidly connected to a valve rod 37 supporting a valve body 38. Together with a valve seat 39, is valve body forms a shut-off valve in the main pipe 25. In order to control the valve rod 37 this is drawn out past the valve body 38 and is taken up slidingly in an end plug 40 in the housing 11.

Before any flow occurs in the main pipe 25, the valve 38, 39 is closed, since the gas pressure influences the surface 23 of the plunger and not the surface 24. To enable the device to be started, therefore, a by-pass pipe 42 is provided running from the inlet 41 of the main pipe in the housing 11, which by-pass pipe is normally dosed by a needle valve 43. When the device is to be started the needle valve 43 is opened and gas flows from the inlet 41, out through the connection 26 and on via the connection 30 through the control pipe 28 to the connection 29 in the housing 11. The plunger 13 is thus pushed downwards, the valve 38, 39 opens and the device is in operation. The needle valve 43 then closes. In the event of a ruptured pipe the device functions in the same way as previous devices, and the plunger 13 moves upwards so that the valve 38, 39 closes.

An indicating device 44 is arranged to obtain a visual indication of a pipe rupture. The indicating device 44 comprises a spring-loaded pin 45 in force-transmitting, influencing connection with a conical surface 46 on the plunger 13. When a pipe rupture has occurred and the device shuts off the gas supply, the indicating device 44 indicates that this has occurred by the pin 45 being displaced inwards.

In the embodiment according to FIGS. 5 and 6 the valve housing is directly connected to a gas tank or other gas source 36. In this case, thus, the valve housing is screwed directly into the tank. The tank 36 is charged via the non-return valve 77. Initially it is assumed that the plunger 13 with valve body 38 is in its upper, closed position and no gas, or possibly liquid, can leave the tank 36. A predetermined pressure balance must be achieved temporarily in order to open the outlet pipe 25 of the valve. This is done by connecting the upper part 24 of the plunger with the tank pressure via pipes 48 and 28, thereby opening the valve 38, 39. When this pressure equalization has been effected, the temporarily opened operating valve 49 must be closed again. This operating valve may either be of solenoid valve and/or manual type.

The safety device is now in function which means that the valve will close if a pressure difference occurs that exceeds the predetermined, built-in function of the pressure influence and the differences in area between the plunger surfaces 23 and 24.

The internal by-passes 50 are connected in only two of the safety devices in the multiple tank system shown in FIG. 6. The other three devices are opened by the common control pipe 28, connected to each device. Any pressure drop (rupture in pipe or hose) in the common outlet pipe 25 or in the pipe 28, will influence all valves in the system and these will then close. The connection 30 of the control pipe 28 to a common outlet pipe 25 should be placed as far away from the tanks 36 as possible, close to the point of usage, to ensure that as large a part of the system as possible is protected.

The device according to the invention is thus based on the principle of creating internal movement in the device as a result of the pressure variation arising if a pipe rupture occurs, or too large a pressure drop in the main pipe. This movement can be captured in various ways, e.g. as described above by means of an inductive transducer, but microswitches are also possible, or with the aid of a purely mechanical function. The pressure-relieved chamber 20 in the indicator can thus also be utilized, for instance.

The signal occurring in the transducer can then be utilized in various ways. It can either, as described above, be allowed to influence solenoid valves, or pneumatically or hydraulically controlled valves. The placing of the pipe device and of the valves is entirely dependent on what is to be achieved. The device may be placed directly on the pressure source, for instance. Furthermore, just indication is possible, or the signal from the device can control one or more valves to shut off the gas flow. The safety device can also be arranged downstream of the shut-off valves. This admittedly leaves parts of the system unprotected against pipe ruptures but this is acceptable in many cases if the system is protected in some other way. It is important for the control pipe to be connected downstream of the safety device at the point of use, or as close to this as possible.

I claim:

1. A safety device against ruptures in gas pipes, the gas pipes including a main pipe and a control pipe, the gas pipes further having a gas source for producing a flow of gas within the gas pipes, the control pipe being connected to the main pipe in the proximity of a user, said safety device comprising:
    a housing with a cavity;
    a plunger within said cavity, said plunger being movable to and fro within said cavity, said plunger dividing said cavity into at least three chambers, said plunger having a smaller influencing surface facing one of said at least three chambers, said plunger having a larger influencing surface facing another of said at least three chambers, and said third of said at least three chambers being pressure-relieved;
    said housing further has a connection to the main pipe, said connection communicating with said smaller influencing surface of said plunger, the gas contained within the main pipe pushing said plunger upward;
    said housing further has a connection to the control pipe, said connection communicating with said larger influencing surface of said plunger, whereby, when the pipes contain a gas, the gas contained within the control pipe pushes said plunger towards the main pipe; and
    means for shutting off the flow of gas from the gas source when said plunger moves towards the control pipe.

2. The safety device against ruptures in gas pipes according to claim 1, wherein said means for shutting off the flow of gas from the gas source when said plunger moves upward comprise a transducer within said pressure-relieved chamber, and a shoulder on said plunger within said pressure-relieved chamber, said transducer being selected to produce a voltage in response to movement of said shoulder.

3. The safety device against ruptures in gas pipes according to claim 2, wherein said means for shutting off the flow of gas from the gas source when said plunger moves upward further comprise a solenoid valve electrically connected to said transducer.

4. The safety device against ruptures in gas pipes according to claim 1, wherein said means for shutting off the flow of gas from the gas source when said plunger moves upward comprise a valve rod rigidly connected to said plunger and supporting a valve body, and a valve seat, said valve body and said valve seat together forming a shut-off valve for the main pipe.

5. The safety device against ruptures in gas pipes according to claim 4, further comprising a by-pass pipe, said by-pass pipe being normally closed by a valve.

6. The safety device against ruptures in gas pipes according to claim 1, further comprising an indicating device for providing an indication of pipe rupture.

7. The safety device against ruptures in gas pipes according to claim 6, wherein said indicating device comprises a conical surface on said plunger, and a spring-loaded pin in force-transmitting, influencing connection with said conical surface on said plunger.

8. A safety device against ruptures in gas pipes, the gas pipes including a main pipe, the gas pipes further having a gas source producing a flow of gas within the gas pipes, said safety device comprising:
    a housing with a cavity;
    a plunger within said cavity, said plunger being movable to and fro within said cavity, said plunger dividing said cavity into at least three chambers, said plunger having a smaller influencing surface facing one of said at least three chambers, said plunger having a larger influencing surface facing another of said at least three chambers, and said third of said at least three chambers being pressure-relieved;
    said housing further has a connection to the main pipe, said connection communicating with said smaller influencing surface of said plunger, the gas contained within the main pipe pushing said plunger upward;
    a control pipe connected to the main pipe in the proximity of a user;
    said housing further has a connection to said control pipe, said connection communicating with said larger influencing surface of said plunger, whereby, when the pipes contain a gas, the gas contained within said control pipe pushes said plunger downward; and means for shutting off the flow of gas from the gas source when said plunger moves upward.

9. The safety device against ruptures in gas pipes according to claim 8, wherein said means for shutting off the flow of gas from the gas source when said plunger moves upward comprise a transducer within said pressure-relieved chamber, and a shoulder on said plunger within said pressure-relieved chamber, said transducer being selected to produce a voltage in response to movement of said shoulder.

10. The safety device against ruptures in gas pipes according to claim 9, wherein said means for shutting off the flow of gas from the gas source when said plunger moves upward further comprise a solenoid valve electrically connected to said transducer.

11. The safety device against ruptures in gas pipes according to claim 8, wherein said means for shutting off the flow of gas from the gas source when said plunger moves upward comprise a valve rod rigidly connected to said plunger and supporting a valve body, and a valve seat, said valve body and said valve seat together forming a shut-off valve for the main pipe.

12. The safety device against ruptures in gas pipes according to claim 11, further comprising a by-pass pipe, said by-pass pipe being normally closed by a valve.

13. The safety device against ruptures in gas pipes according to claim 8, further comprising an indicating device for providing an indication of pipe rupture.

14. The safety device against ruptures in gas pipes according to claim 13, wherein said indicating device comprises a conical surface on said plunger, and a spring-loaded pin in force-transmitting, influencing connection with said conical surface on said plunger.

15. A safety device against ruptures in gas pipes, the gas pipes further having a gas source producing a flow of gas within the gas pipes, said safety device comprising:

a housing with a cavity;

a plunger within said cavity, said plunger being movable to and fro within said cavity, said plunger dividing said cavity into at least three chambers, said plunger having a smaller influencing surface facing one of said at least three chambers, said plunger having a larger influencing surface facing another of said at least three chambers, and said third of said at least three chambers being pressure-relieved;

a main pipe;

said housing further has a connection to said main pipe, said connection communicating with said smaller influencing surface of said plunger, the gas contained within said main pipe pushing said plunger upward;

a control pipe connected to said main pipe in the proximity of a user;

said housing further has a connection to said control pipe, said connection communicating with said larger influencing surface of said plunger, whereby, when the pipes contain a gas, the gas contained within said control pipe pushes said plunger downward; and means for shutting off the flow of gas from the gas source when said plunger moves upward.

16. The safety device against ruptures in gas pipes according to claim 15, wherein said means for shutting off the flow of gas from the gas source when said plunger moves upward comprise a transducer within said pressure-relieved chamber, and a shoulder on said plunger within said pressure-relieved chamber, said transducer being selected to produce a voltage in response to movement of said shoulder.

17. The safety device against ruptures in gas pipes according to claim 16, wherein said means for shutting off the flow of gas from the gas source when said plunger moves upward further comprise a solenoid valve electrically connected to said transducer.

18. The safety device against ruptures in gas pipes according to claim 15, wherein said means for shutting off the flow of gas from the gas source when said plunger moves upward comprise a valve rod rigidly connected to said plunger and supporting a valve body, and a valve seat, said valve body and said valve seat together forming a shut-off valve for said main pipe.

19. The safety device against ruptures in gas pipes according to claim 18, further comprising a by-pass pipe, said by-pass pipe being normally closed by a valve.

20. The safety device against ruptures in gas pipes according to claim 15, further comprising an indicating device for providing an indication of pipe rupture.

\* \* \* \* \*

UNITED STATES PATENT AND TRADEMARK OFFICE
CERTIFICATE OF CORRECTION

PATENT NO. : 6,044,863
DATED : April 4, 2000
INVENTOR(S) : Claes Grantfelt

It is certified that error appears in the above-identified patent and that said Letters Patent are hereby corrected as shown below:

Col. 1, line 5, "pipes" should be --pipes.--;
Col 1, line 9, "alid' shold be --and--;
Col 1, line 10, "rapture" should be --rupture--;
Col 2, line 42, "is" should be --this.

Signed and Sealed this

Third Day of April, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO.    : 6,044,863
DATED         : April 4, 2000
INVENTOR(S)   : Claes Granfelt It is certified that error appears in the above-identified patent and that said Letters Patent is hereby corrected as shown below:

In the Certificate of Correction issued on April 3, 2001:
Column 1,
Line 9, "alid / or" should be -- and /or--.

Item [75] Inventors:
Column 2,
Line 42, "is" should be -- this -- .

Signed and Sealed this

Eleventh Day of September, 2001

Attest:

NICHOLAS P. GODICI
Attesting Officer     Acting Director of the United States Patent and Trademark Office